US009463438B2

(12) United States Patent
Lewis et al.

(10) Patent No.: US 9,463,438 B2
(45) Date of Patent: *Oct. 11, 2016

(54) TEMPLATED CATALYST COMPOSITION AND ASSOCIATED METHOD

(71) Applicant: General Electric Company, Schenectady, NY (US)

(72) Inventors: Larry Neil Lewis, Scotia, NY (US); Dan Hancu, Clifton Park, NY (US); Oltea Puica Siclovan, Rexford, NY (US); Ming Yin, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 14/160,356

(22) Filed: Jan. 21, 2014

(65) Prior Publication Data

US 2014/0199222 A1 Jul. 17, 2014

Related U.S. Application Data

(62) Division of application No. 12/362,520, filed on Jan. 30, 2009, now abandoned.

(51) Int. Cl.
*B01J 21/04* (2006.01)
*B01J 23/50* (2006.01)
*B01D 53/94* (2006.01)
(Continued)

(52) U.S. Cl.
CPC ............ *B01J 23/50* (2013.01); *B01D 53/9418* (2013.01); *B01J 35/002* (2013.01); *B01J 35/023* (2013.01); *B01J 37/0018* (2013.01); *B01J 37/0201* (2013.01); *B01J 37/033* (2013.01); *B01J 37/036* (2013.01); *B01D 2255/104* (2013.01)

(58) Field of Classification Search
CPC .......... B01J 21/04; B01J 23/50; B01J 37/00; B01J 37/0018; B01J 37/033; B01J 37/036
USPC ........................... 502/348; 423/213.2, 239.1
See application file for complete search history.

(56) References Cited

U.S. PATENT DOCUMENTS

| 4,480,050 A | 10/1984 | Brennan |
| 5,244,852 A | 9/1993 | Lachman |

(Continued)

FOREIGN PATENT DOCUMENTS

| DE | 4128629 | 8/1999 |
| EP | 0577438 | 5/1994 |

(Continued)

OTHER PUBLICATIONS

Unofficial English translation of a CN Office Action dated Jan. 24, 2014 issued in connection with corresponding CN Application No. 201010114876.0.

*Primary Examiner* — Patricia L Hailey
(74) *Attorney, Agent, or Firm* — Joseph J. Christian

(57) ABSTRACT

A composition includes a templated metal oxide substrate having a plurality of pores and a catalyst material includes silver. The composition under $H_2$ at 30 degrees Celsius, the composition at a wavelength that is in a range of from about 350 nm to about 500 nm has a VIS-UV absorbance intensity that is at least 20 percent less than a standard silver alumina catalyst (Ag STD). The standard alumina is Norton alumina, and which has the same amount of silver by weight.

11 Claims, 6 Drawing Sheets

(51) Int. Cl.
*B01J 35/00* (2006.01)
*B01J 35/02* (2006.01)
*B01J 37/00* (2006.01)
*B01J 37/02* (2006.01)
*B01J 37/03* (2006.01)

(56) References Cited

U.S. PATENT DOCUMENTS

| | | | |
|---|---|---|---|
| 5,510,306 | A | 4/1996 | Murray |
| 5,609,839 | A | 3/1997 | Itoh |
| 5,622,684 | A * | 4/1997 | Pinnavaia ............ C01B 37/00 423/702 |
| 5,750,459 | A | 5/1998 | Marella |
| 5,770,778 | A | 6/1998 | Naujokas |
| 5,772,972 | A | 6/1998 | Hepburn |
| 5,795,559 | A | 8/1998 | Pinnavaia |
| 5,802,845 | A | 9/1998 | Abe |
| 5,879,645 | A | 3/1999 | Park |
| 5,911,966 | A | 6/1999 | Muller |
| 6,027,706 | A * | 2/2000 | Pinnavaia ............ C01B 37/00 423/600 |
| 6,146,602 | A | 11/2000 | Narula |
| 6,284,211 | B1 | 9/2001 | Miyadera |
| 6,703,343 | B2 | 3/2004 | Park |
| 6,881,390 | B2 | 4/2005 | Yaluris |
| 6,936,232 | B2 | 8/2005 | Gillespie |
| 7,045,485 | B2 | 5/2006 | Kelker |
| 7,081,231 | B1 | 7/2006 | Aardahl |
| 7,132,165 | B2 | 11/2006 | Pinnavaia et al. |
| 7,214,643 | B2 | 5/2007 | Yamamoto |
| 7,371,358 | B2 | 5/2008 | Upchurch |
| 7,431,905 | B2 | 10/2008 | Hancu |
| 7,485,271 | B2 | 2/2009 | Golunski |
| 7,494,634 | B2 | 2/2009 | Vitse |
| 7,612,011 | B2 | 11/2009 | Vanderspurt et al. |
| 7,655,203 | B2 | 2/2010 | Hancu |
| 7,709,414 | B2 | 5/2010 | Fujdala |
| 7,803,338 | B2 | 9/2010 | Socha |
| 7,867,598 | B2 | 1/2011 | Miyairi |
| 8,034,311 | B2 | 10/2011 | Ikeda |
| 8,037,674 | B2 | 10/2011 | Kupe |
| 8,062,991 | B2 | 11/2011 | Male et al. |
| 8,101,145 | B1 | 1/2012 | Norton |
| 8,353,155 | B2 | 1/2013 | Lewis et al. |
| 8,476,187 | B2 | 7/2013 | Norton et al. |
| 8,505,285 | B2 | 8/2013 | Winkler et al. |
| 8,530,369 | B2 | 9/2013 | Lewis et al. |
| 8,586,501 | B2 | 11/2013 | Lewis |
| 8,889,078 | B2 * | 11/2014 | Ji ...................... B01D 53/864 422/170 |
| 2003/0118960 | A1 | 6/2003 | Park |
| 2003/0134745 | A1 | 7/2003 | Park |
| 2003/0176280 | A1 | 9/2003 | Caze |
| 2005/0135980 | A1 | 6/2005 | Park |
| 2005/0198092 | A1 | 9/2005 | Shen |
| 2006/0009349 | A1 | 1/2006 | Fujimoto |
| 2006/0075742 | A1 | 4/2006 | Lee |
| 2006/0133976 | A1 | 6/2006 | Male |
| 2006/0228283 | A1 | 10/2006 | Malyala |
| 2007/0059223 | A1 | 3/2007 | Golunski |
| 2007/0101704 | A1 | 5/2007 | Goulette |
| 2007/0149385 | A1 | 6/2007 | Liu |
| 2008/0020925 | A1 | 1/2008 | Larcher |
| 2008/0053073 | A1 | 3/2008 | Kalyanaraman |
| 2008/0085231 | A1 | 4/2008 | Vitse |
| 2008/0124264 | A1 | 5/2008 | Ikeda |
| 2008/0131345 | A1 | 6/2008 | Vitse |
| 2008/0141660 | A1 | 6/2008 | Kim |
| 2009/0004079 | A1 | 1/2009 | Hancu |
| 2009/0074641 | A1 | 3/2009 | Lewis |
| 2009/0075813 | A1 | 3/2009 | Whisenhunt |
| 2009/0263297 | A1 | 10/2009 | Hancu |
| 2009/0318283 | A1 | 12/2009 | Keshavan |
| 2010/0095591 | A1 | 4/2010 | Hancu |
| 2010/0143227 | A1 | 6/2010 | Keshavan et al. |
| 2010/0150801 | A1 | 6/2010 | Keshavan et al. |
| 2010/0196236 | A1 | 8/2010 | Lewis et al. |
| 2010/0196237 | A1 | 8/2010 | Yin et al. |
| 2010/0233053 | A1 | 9/2010 | Lewis et al. |
| 2011/0047988 | A1 | 3/2011 | Lewis et al. |
| 2011/0047995 | A1 | 3/2011 | Lewis |
| 2011/0120100 | A1 | 5/2011 | Yin et al. |
| 2011/0152064 | A1 | 6/2011 | Keshavan et al. |
| 2011/0152068 | A1 | 6/2011 | Keshavan et al. |
| 2011/0166015 | A1 | 7/2011 | Norton |
| 2011/0209459 | A1 * | 9/2011 | Hancu ................... F01N 3/025 60/274 |
| 2011/0209466 | A1 | 9/2011 | Yin et al. |
| 2012/0047877 | A1 | 3/2012 | Winkler |
| 2012/0082606 | A1 | 4/2012 | Lewis et al. |
| 2012/0093703 | A1 | 4/2012 | Lewis et al. |
| 2012/0329644 | A1 | 12/2012 | Siclovan et al. |
| 2013/0129575 | A1 | 5/2013 | Lewis et al. |
| 2014/0199223 | A1 | 7/2014 | Yin |

FOREIGN PATENT DOCUMENTS

| | | |
|---|---|---|
| EP | 0207550 | 9/1995 |
| EP | 0714693 | 6/1996 |
| EP | 0787522 | 8/1997 |
| EP | 0947236 | 10/1999 |
| EP | 1029582 | 8/2000 |
| EP | 0895812 | 7/2003 |
| EP | 0914864 B1 | 8/2007 |
| EP | 1832345 | 9/2007 |
| EP | 1944075 | 7/2008 |
| FR | 2842419 | 1/2004 |
| JP | 4354536 | 8/1992 |
| JP | 6126134 | 5/1994 |
| JP | 06343829 | 12/1994 |
| WO | 9929400 | 6/1996 |
| WO | 2005035108 | 4/2005 |
| WO | 2006027998 | 3/2006 |
| WO | 2006093802 | 9/2006 |
| WO | 2007049851 | 5/2007 |
| WO | 2009038855 | 3/2009 |
| WO | 2009038855 A2 | 3/2009 |
| WO | 2009038901 | 3/2009 |
| WO | 2011084484 | 7/2011 |

* cited by examiner

TEMPLATED CATALYST COMPOSITION AND ASSOCIATED METHOD

BACKGROUND

1. Technical Field

The invention includes embodiments that relate to a catalyst composition. The invention includes embodiments that relate to a method of making the catalyst composition and a method of using the catalyst composition for reducing nitrogen oxides.

2. Discussion of Art

Currently, lean NOx traps may be used in exhaust gas treatment systems. In these, NOx reduction catalysts and methods include the alkali and alkali earth metal in the catalyst composition where the alkali metal or the alkali earth metal absorbs the NOx and then the reductant reduces NOx to nitrogen. This type of reaction may not have desirable kinetics.

Silver-containing alumina is known for selective catalytic reduction (SCR) of NOx using linear hydrocarbon reductants. However, reductants containing aromatics like those present in Diesel fuel, lead to poor NOx reduction with concomitant carbon deposition.

Therefore, it may be desirable to have a catalyst composition with properties and characteristics that differ from those properties of currently available compositions or catalysts. It may be desirable to have a method that differs from those methods currently available.

BRIEF DESCRIPTION

In one embodiment, a composition includes a templated metal oxide substrate having a plurality of pores and a catalyst material includes silver. The composition, under $H_2$ at 30 degrees Celsius, at a wavelength that is in a range of from about 350 nm to about 500 nm has a visible-ultra-violet (VIS-UV) absorbance intensity that is at least 20 percent less than a standard silver alumina catalyst (Ag STD) having the same amount of silver by weight. The standard alumina is Norton alumina.

In one embodiment, the catalyst composition is made by reacting a metal alkoxide with a silver composition and a templating agent to form a reaction product. The templating agent is selected from a surfactant, cyclodextrin, crown ether, or a mixture thereof. The reaction product is hydrolyzed to form a hydrolyzed reaction product. The hydrolyzed reaction product is condensed to form a templated substrate. The catalyst material loading of the templated substrate can be controlled by controlling the reacting, hydrolyzing and condensing steps. The metal alkoxide is aluminum alkoxide and the aluminum alkoxide is selected from aluminum methoxide, aluminum ethoxide, aluminum propoxide, or aluminum butoxide.

In one embodiment, a method of using the catalyst composition introduces a gas stream in a chamber having a composition that includes both a templated metal oxide substrate having a plurality of pores, and a catalyst material that includes silver. The silver is present in an amount of at least about three weight percent based on a total weight of the substrate. The nitrogen oxide present in the gas stream is reduced at a temperature in a range of from about 275 degree to about 450 degrees Celsius in the chamber in one embodiment. In another embodiment, the nitrogen oxide present in the gas stream is reduced at a temperature less than about 350 degrees Celsius in the chamber.

DETAILED DESCRIPTION

Figure 1:
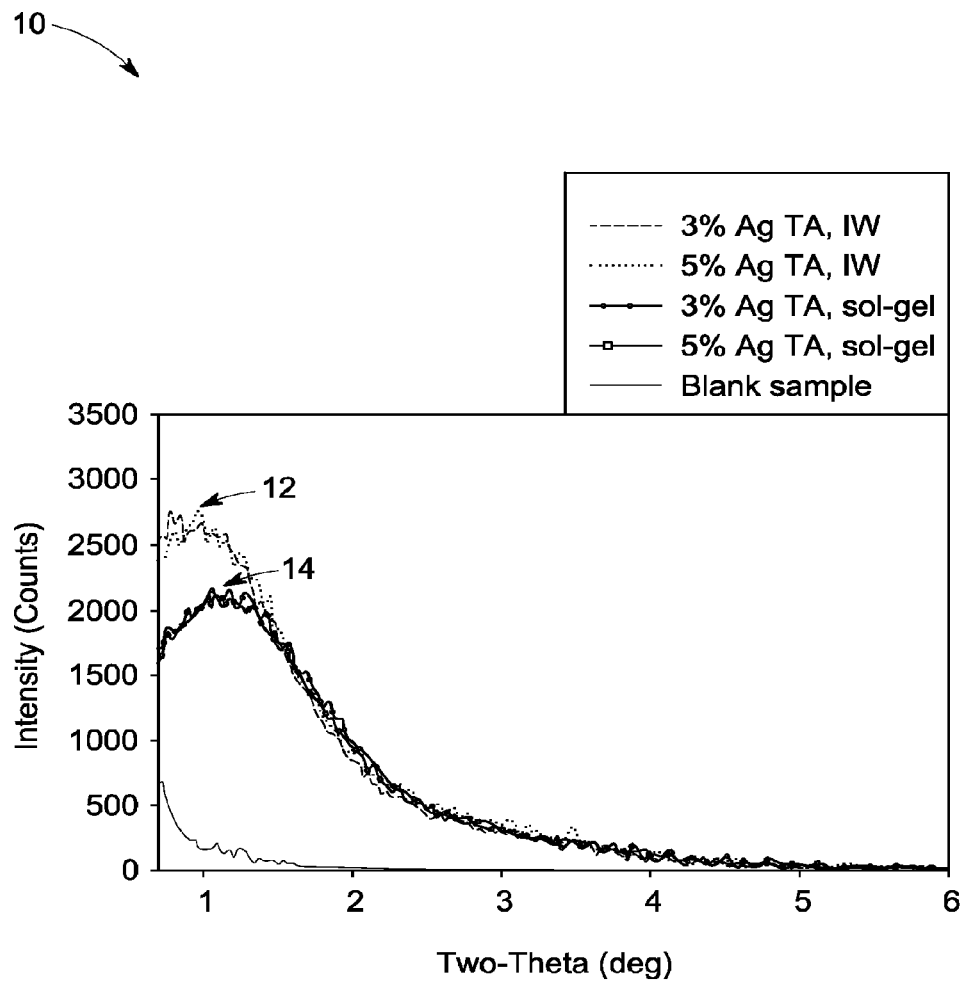
FIG. 1 is a graph of low angle XRD scan.

The systems and methods described herein include embodiments that relate to a catalyst composition, embodiments that relate to a method of making the catalyst composition, and a method of using the catalyst composition for reducing nitrogen oxides. Generally, disclosed is a NOx reduction catalyst and NOx reduction system for reducing NOx in exhaust gas discharged from a combustion device. Suitable combustion devices may include furnaces, ovens or engines.

As used herein, a catalyst is a substance that can cause a change in the rate of a chemical reaction without itself being consumed in the reaction. A slurry is a mixture of a liquid and finely divided particles. A sol is a colloidal solution. A powder is a substance including finely dispersed solid particles. Templating refers to a controlled patterning and may include molecular self-assembly; and, templated refers to determined control of an imposed pattern. A monolith may be a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

The substrate may include one or more of cordierite, alumina, silica, or titania. Combinations may be useful, too, such as silica-alumina. In other embodiments, other substrates may be suitable and can be selected based on end-use parameters.

In addition to being templated, the substrate may be a ceramic honeycomb or metal or metal compound substrate. With regard to the templating, the substrate material may have a plurality of pores that may have specific dimensions and periodicity. That is, the templated metal oxide may have periodically arranged templated pores of determined dimensions. The dimensions can include pore diameter, degree of curvature, uniformity of the inner surface, and the like. The average diameter of the pores may be greater than about 2 nanometers. The average diameter of the pores may be less than about 100 nanometers. In one embodiment, the average diameter of the pores may be in a range from about 2 nanometers to about 20 nanometers, from about 20 nanometers to about 40 nanometers, from about 40 nanometers to about 60 nanometers, from about 60 nanometers to about 80 nanometers, or from about 80 nanometers to about 100 nanometers. The pores may have a periodicity greater than about 50 Angstroms. The pores may have a periodicity less than about 130 Angstroms. The pores may have a periodicity in the range of from about 50 Angstroms to about 80 Angstroms, from about 80 Angstroms to about 100 Angstroms, from about 100 Angstroms to about 120 Angstroms, or from about 120 Angstroms to about 150 Angstroms.

FIG. 1 is a Low angle XRD scan for Ag-Templated Alumina comprising 3 percent or 5 percent silver prepared via sol gel or incipient wetness (IW) method. All samples calcined at 600 degrees Celsius. The graph 10 shows that Ag-Templated Alumina (TA) has pore dimensions of from 75-95 Angstroms depending on the method of preparation. The graph 10 has peak 12 that denotes the average pore-to-pore correlation of about 75 Angstroms and peak 14 denotes the average pore-to-pore correlation of about 95 Angstroms.

The templated porous metal oxide substrate may have a surface area that is greater than about 0.5 meter$^2$/gram. In one embodiment, the surface area is in a range of from about 0.5 meter$^2$/gram to about 10 meter$^2$/gram, from about 10 meter$^2$/gram to about 100 meter$^2$/gram, from about 100 meter$^2$/gram to about 200 meter$^2$/gram, or from about 200 meter$^2$/gram to about 1200 meter$^2$/gram. In one embodiment, the porous substrate has a surface area that is in a range of from about 0.5 meter$^2$/gram to about 200 meter$^2$/gram. In one embodiment, the porous substrate has a surface area in a range of from about 200 meter$^2$/gram to about 250 meter$^2$/gm, from about 250 meter$^2$/gram to about 500 meter$^2$/gm, from about 500 meter$^2$/gram to about 750 meter$^2$/gm, from about 750 meter$^2$/gram to about 1000 meter$^2$/gm, from about 1000 meter$^2$/gram to about 1250 meter$^2$/gm, from about 1250 meter$^2$/gram to about 1500 meter$^2$/gm, from about 1500 meter$^2$/gram to about 1750 meter$^2$/gm, from about 1750 meter$^2$/gram to about 2000 meter$^2$/gm, or greater than about 2000 meter$^2$/gm.

Figure 2:
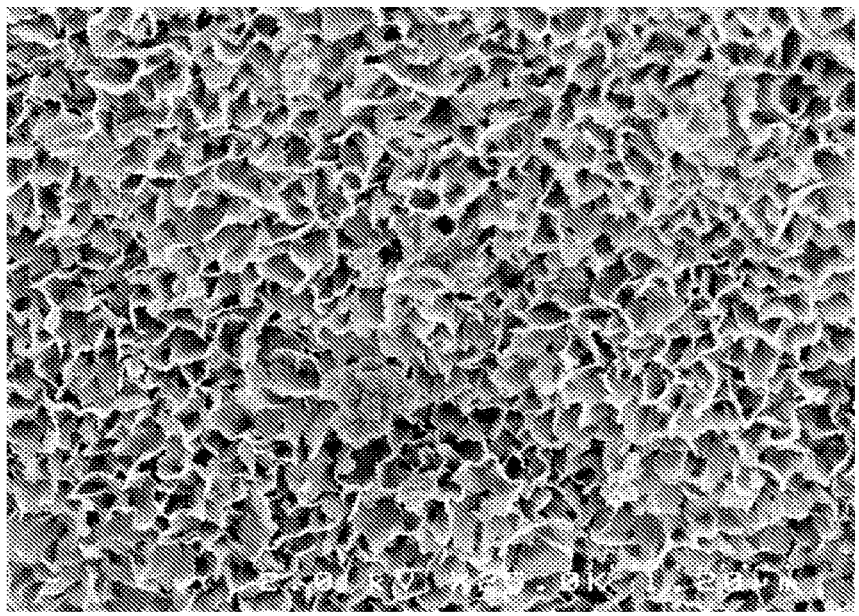
FIG. 2 is an image of Scanning electron microscope (SEM) for Ag-Templated Alumina.
Figure 3:
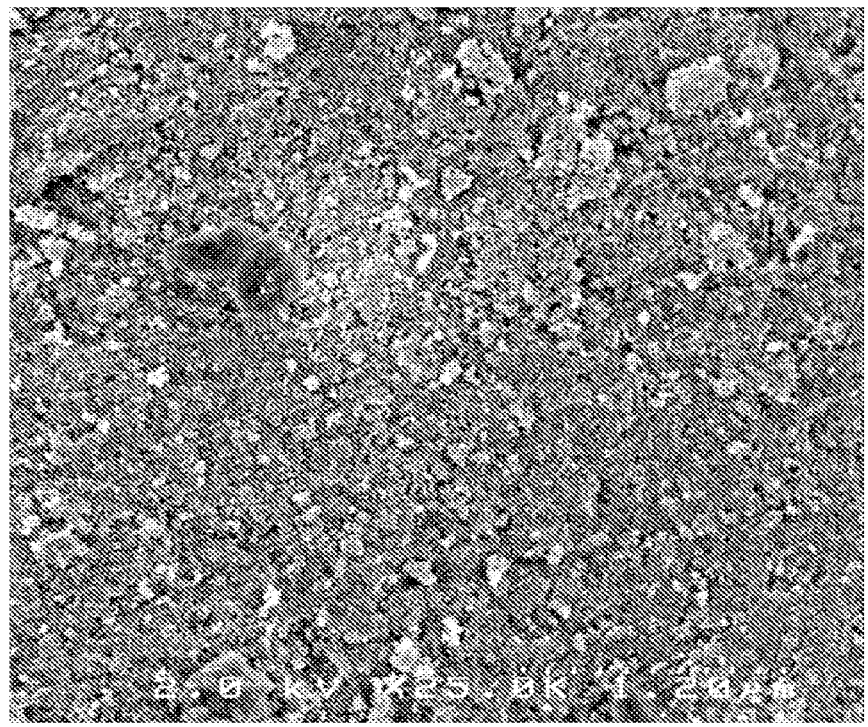
FIG. 3 is an image of Scanning electron microscope (SEM) for SBA 200 from SASOL.
Figure 4:
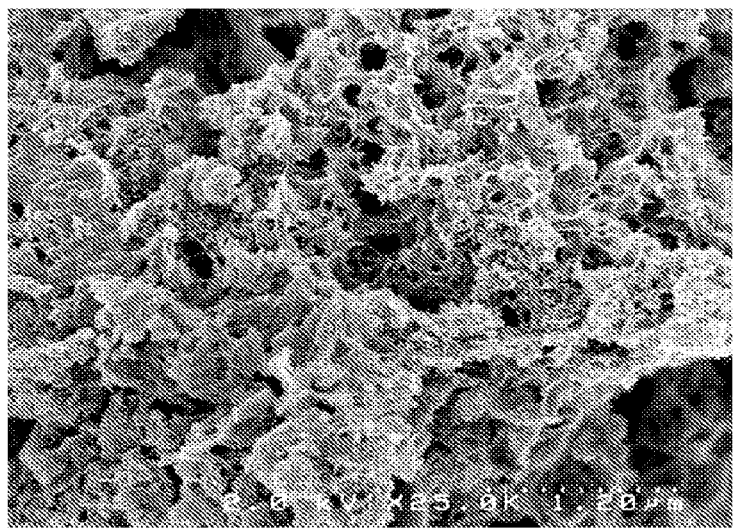
FIG. 4 is an image of Scanning electron microscope (SEM) for Norton Alumina.

SEM analysis of Ag-Templated Alumina (TA), FIG. 2 shows the surface area and the pore structure. The SEM picture in FIG. 2 is contrasted in FIG. 3 for SBA 200 with relatively lower surface area and lower activity than Ag-TA and similarly for Norton alumina in FIG. 4.

The templated porous metal oxide substrate may be present in the catalyst composition in an amount that is greater than about 50 mole percent. In one embodiment, the amount of templated metal oxide substrate may be present in a range of from about 50 mole percent to about 60 mole percent, from about 60 mole percent to about 70 mole percent, from about 70 mole percent to about 80 mole percent, from about 80 mole percent to about 90 mole percent, from about 90 mole percent to about 95 mole percent, from about 95 mole percent to about 97 mole percent, based on the total amount of the catalyst composition.

In one embodiment, the metal oxide is an aluminum oxide, but other oxide support materials may also be considered. These other support materials may include one or more of zirconium, silicon, or titanium. Suitable support materials may include aluminosilicates, aluminophosphates, hexaaluminates, zirconates, titanosilicates, titanates, or a combination of two or more thereof.

The composition may also have a promoter for the catalytic reaction of nitrogen oxide reduction. Non-limiting examples of the catalyst may include various metals or metal oxides. The promoter may include one or more of indium, gallium, tin, silver, manganese, molybdenum, chromium, germanium, cobalt, nickel, gold, copper, iron, and their oxides. In one embodiment, the promoter includes silver.

In one embodiment, the catalyst material is free of one or both of alkali metal and alkaline earth metal. In one embodiment, the composition reduces NOx without absorbing the NOx on the catalyst material. In this embodiment, the catalytic action is distinct from the actions of a lean NOx trap. In one embodiment, the composition is free of transition metal.

In one embodiment, the catalyst composition is made by reacting a metal alkoxide with a silver composition and a templating agent to form a reaction product. The templating agent may be a surfactant. Other suitable templating agents may include cyclodextrin or a crown ether. The reaction product may be hydrolyzed to form a hydrolyzed reaction product. The hydrolyzed reaction product may be condensed to form a templated substrate. The catalyst material loading of the templated substrate may be controlled, at least in part, by controlling the reacting, hydrolyzing and condensing steps. The composition under $H_2$ at 30 degrees Celsius, and at a wavelength that is in a range of from about 350 nm to about 500 nm, has a VIS-UV absorbance intensity that is at least 20 percent less than a standard silver alumina catalyst (Ag STD). The standard alumina is Norton alumina that has the same amount of silver by weight as the corresponding material to which it is compared.

In one embodiment, the silver composition may be selected from a group consisting of silver salt of inorganic acids, silver salt of organic acids, and silver oxides. The silver may be present in an amount of at least about three weight percent based on a total weight of the substrate in one embodiment. In other embodiments, the silver may be present in an amount of less than or equal to about ten weight percent of a total weight of the substrate.

In one method of making the catalyst, a metal alkoxide, a silver composition and a templating agent may be mixed in a vessel with a suitable solvent to form a reaction product. Initially, the reaction product may be in the form of a sol. The sol may be converted to a gel by the sol gel process. The gel may be subject to one or more of filtration, washing, drying and calcinating to yield a solid catalyst composition that includes the catalytic metal disposed on a porous substrate.

The effect of iron on Ag-TA catalytic activity is tested by varying the method by which silver is added to templated alumina (TA). The alternative method for introducing silver or any other element is called incipient wetness method whereby the precursor is added to the hydrolyzed and condensed templated alumina as an aqueous solution that wets the alumina followed by calcination. Templated alumina with sol gel silver had relatively increased activity for NOx reduction compared to templated alumina used with incipient wetness (IW) silver. However, TA with IW silver at some silver levels displayed catalytic activity similar to that for Ag-TA sol gel. There are alternative methods of adding silver or any other element in the templated alumina and those methods are known as impregnation methods. In one embodiment, the incipient wetness method is a type of impregnation method.

During the calcination process, the silver composition may be reduced to a catalytic metal. The calcination may be conducted at a temperatures in a range of from about 350 degrees Celsius to about 400 degrees Celsius, from about 400 degrees Celsius to about 500 degrees Celsius, from about 500 degrees Celsius to about 600 degrees Celsius, from about 600 degrees Celsius to about 700 degrees Celsius, or from about 700 degrees Celsius to about 800 degrees Celsius. In one embodiment, the calcination may be conducted at a temperature of about 550 degrees Celsius. The calcination may be conducted for a time period of from about 10 minutes to about 30 minutes, from about 30 minutes to about 60 minutes, from about 60 minutes to about 1 hour, from about 1 hour to about 10 hours, from about 10 hours to about 24 hours, or from about 24 hours to about 48 hours.

Suitable solvents may include aprotic polar solvents, polar protic solvents, and non-polar solvents. Suitable aprotic polar solvents may include propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include water, nitromethane, acetonitrile, and short chain alcohols. Suitable short chain alcohols may include one or more of methanol, ethanol, propanol, isopropanol, butanol, or the like. Suitable non-polar solvents may include benzene, toluene, methylene chloride, carbon tetrachloride, hexane, diethyl ether, or tetrahydrofuran. Co-solvents may also be used. Ionic liquids may be used as solvents during gelation. Exemplary solvents may include 2-butanol and 2-propanol.

Selection of the type(s) and amounts of the templating agent may affect or control the pore characteristics of the resultant templated substrate. Suitable templating agents may include one or more surfactants. Suitable surfactants may include cationic surfactants, anionic surfactants, non-ionic surfactants, or Zwitterionic surfactants. In one embodiment, the templating agent may include one or more cyclic species. Examples of such cyclic species may include cyclodextrin and crown ether.

Suitable cationic surfactants may include cetyltrimethyl ammonium bromide (CTAB), cetylpyridinium chloride (CPC), polyethoxylated tallow amine (POEA), benzalkonium chloride (BAC), and benzethonium chloride (BZT). Other suitable cationic surfactants may include those having a chemical structure denoted by $CH_3(CH_2)_{15}N(CH3)_3$-Br, $CH_3(CH_2)_{15}$-(PEO)n-OH where n=2 to 20 and where PEO is polyethylene oxide, $CH_3(CH_2)_{14}COOH$ and $CH_3(CH_2)_{15}NH_2$. Other suitable cationic surfactants may include one or more fluorocarbon surfactants, such as $C_3F_7O(CFCF_3CF_2O)_2CFCF_3$—$CONH(CH_2)_3N(C_2H_5)_2CH_3I)$, which is commercially available as FC-4.

Suitable anionic surfactants may include one or more of sodium dodecyl sulfate (SDS), ammonium lauryl sulfate, alkyl sulfate salts, sodium laureth sulfate also known as sodium lauryl ether sulfate (SLES), alkyl benzene sulfonate, soaps, fatty acid salts, or sodium dioctyl sulfonate (AOT). Suitable Zwitterionic surfactants may include dodecyl betaine, dodecyl dimethylamine oxide, cocamidopropyl betaine, or coco ampho-glycinate.

Nonionic surfactants may have polyethylene oxide molecules as hydrophilic groups. Suitable ionic surfactants may include alkyl poly(ethylene oxide), copolymers of poly (ethylene oxide) and poly (propylene oxide) commercially called Poloxamers or Poloxamines and commercially available under the trade name PLURONICS from the BASF company.

Suitable non-ionic surfactants may include one or more alkyl polyglucosides; octylphenol ethoxylate; decyl maltoside; fatty alcohols; cetyl alcohol; oleyl alcohol; cocamide monoethanolamine; cocamide diethanolamine; cocamide triethanolamine; 4-(1,1,3,3-tetramethyl butyl) phenyl-poly (ethylene glycol); polysorbitan monooleate; or amphiphilic poly (phenylene ethylene) (PPE). Suitable poly glucosides may include octyl glucoside. Other suitable non-ionic surfactants may include long-chain alkyl amines, such as primary alkylamines and N,N-dimethyl alkylamines. Suitable primary alkylamines may include dodecylamine and hexadecylamine. Suitable N,N-dimethyl alkylamines may include N,N-dimethyl dodecylamine or N,N-dimethyl hexadecylamine. Suitable non-ionic surfactant may include (1,1,3,3-Tetramethylbutyl) phenyl-polyethylene glycol, which is commercially available as TRITON X-114 from the Sigma-Aldrich company.

In one embodiment, the templating agent may include cyclodextrin. Cyclodextrins may include cyclic oligosaccharides that include 5 or more α-D-glucopyranoside units linked 1 to 4, as in amylose (a fragment of starch). Suitable cyclodextrins in the templating agent may include 5-membered to about 150-membered cyclic oligosaccharides. Exemplary cyclodextrins include a number of glucose monomers ranging from six to eight units in a ring. Suitable cyclodextrins are α-cyclodextrin, a six-membered sugar ring molecule; β-cyclodextrin, a seven sugar ring molecule; γ-cyclodextrin, an eight sugar ring molecule; or the like.

As noted above, the templating agent may include crown ethers. Crown ethers are heterocyclic chemical compounds that include a ring containing several ether groups. Suitable crown ethers may include oligomers of ethylene oxide, the repeating unit being ethyleneoxy, i.e., —CH2CH2O—. Useful members of this series may include the tetramer (n=4), the pentamer (n=5), and the hexamer (n=6). Crown ethers derived from catechol may be used in the templating agent. Crown ethers that strongly bind certain types of cations to form complexes may be included in the templating agents. The oxygen atoms in the crown ether may coordinate with a cation located at the interior of the ring, whereas the exterior of the ring may be hydrophobc. For example, 18-crown-6 has high affinity for potassium cation, 15-crown-5 for sodium cation, and 12-crown-4 for lithium cation.

In one embodiment, a method of using the catalyst composition introduces a gas stream in a chamber having the composition that includes a templated metal oxide substrate having a plurality of pores, and a catalyst material comprising silver that is present in an amount of at least about three weight percent based on a total weight of the substrate. The nitrogen oxide present in the gas stream may be reduced at a temperature of about 275 degrees Celsius or greater. In one embodiment, the reduction may occur at a temperature range of from about 275 degrees Celsius to about 300 degrees Celsius, from about 300 degrees Celsius to about 325 degrees Celsius, or from about 325 degrees Celsius to about 350 degrees Celsius. The nitrogen oxide present in the gas stream may be reduced at a temperature of less than about 350 degrees Celsius in the chamber.

EXAMPLES

Preparation of Material:

Templated alumina is produced as follows, for example. Solution 1 is formed by combining ethylaetoacetate (26.5 g, 0.2 mol), TRITON X-114 (85 g, ca. 0.15 mol) and 2-butanol (500 mL) in a 5-L, 3-neck flask equipped with an addition funnel, a condenser, and a mechanical stirrer. Solution 2 is composed of $Al(O-secBu)_3$ (500 g, 2 mol) and 2-BuOH (2 L). Solution 3 is composed of water (75 mL, 4 mol) and 2-BuOH (850 mL).

Solution 2 is added to Solution 1 while stirring, and is held at ambient temperature for 30 min. Solution 3 is added to solutions 1 and 2 via an addition funnel over about 90 minutes. Mechanical stirring is continued at ambient temperature for 3 hours and then the contents are heated to about reflux for about 20 to about 24 hours.

The contents are cooled and filtered on a #50 paper filter and washed with ethanol. The obtained white solid is dried in vacuo, in a vacuum oven at 80 degrees Celsius. The solid is subjected to Soxhlet extraction with ethanol for 20-24 hours. The solid is dried in a vacuum oven at 80 degrees Celsius, to yield 164 grams. The dry material is heated under $N_2$ in a tube furnace from room temperature to 550 degrees Celsius at a heating rate of 2 degrees Celsius/minute, maintained at 550 degrees Celsius for 1 hr and is calcined in a flow of air at 550 degrees Celsius for 5 hours.

Process for Forming Ttemplated Support with Catalyst Material:

A 5 L, 3-necked flask equipped with a mechanical stirrer, a reflux condenser and an addition funnel, is charged with TRITON X114 (68.7 g, 0.16 mol) and ethylacetoacetate (13.2 g, 0.1 mol) in 250 mL of 2-propanol. Then $Al(O^{sec}Bu)_3$ (249.8 g, 1.02 mol) in 1 L 2-propanol is added and the contents are stirred for 30 minutes. An amount of $AgNO_3$ is dissolved in water (37 mL, 2.06 mol). The amount of silver nitrate is changed as noted below to create a number of reaction products. The solution is combined with 500 mL 2-propanol and is charged to an addition funnel. The contents of the addition funnel are added to a 5 Liter flask over the course of 75 minutes. The stirred solution is refluxed for 24 hours. After cooling, the contents are filtered and washed with about 250 mL of ethanol to obtain a semi-dried mass. The semi-dried mass is subjected to Soxhlet extraction with ethanol for 24 hours and then oven-vacuum dried at 30 mmHg for 24 hours to obtain a solid. The obtained brown solid is calcined under nitrogen in a tube furnace to 550 degrees Celsius at a heating rate of 2 degrees Celsius/minute to obtain a reaction product.

The amount of $AgNO_3$ (2.6 g, 0.0158 mol) for Catalyst Product 1, results in 3 percent silver templated alumina catalyst composition. The amount of $AgNO_3$ (3.463 g, 0.0204 mol) for Catalyst Product 2, results in 4 percent silver templated alumina catalyst composition. The amount of $AgNO_3$ (4.407 g, 0.0259 mol) for Catalyst Product 3, results in 5 percent silver templated alumina catalyst composition. The amount of $AgNO_3$ (5.383 g, 0.0317 mol) for Catalyst Product 4, results in 6 percent silver templated alumina catalyst composition. The amount of $AgNO_3$ (6.391 g, 0.0376 mol) for Catalyst Product 5, results in 7 percent silver templated alumina catalyst composition. The amount of $AgNO_3$ (7.49 g, 0.0441 mol) for Catalyst Product 6, results in 8 percent silver templated alumina catalyst composition. The amount of $AgNO_3$ (8.443 g, 0.0497 mol) for Catalyst Product 7, results in 9 percent silver templated alumina catalyst composition.

Catalyst Product 8—Templated Alumina with 8 percent Silver having a different solvent: A 5 L 3-neck round bottom flask equipped with a mechanical stirrer, reflux condenser, and addition funnel is charged with ethyl acetoacetate (13.26 g, 0.1019 mol), TRITON X114 (69.73 g, 0.1117 mol) and 250 mL of 2-Butanol. The stirrer is then turned on low. Aluminum sec-butoxide (250.96 g, 1.0188 mol) is dissolved in 1 Liter of 2-BuOH and transferred to the 5 L flask. This reaction mixture is stirred under ambient conditions for 30 minutes. $AgNO_3$ (7.49 g, 0.0441 mol) is dissolved in 37.5 mL, of distilled $H_2O$ and then combined with 425 mL of 2-BuOH to produce a transparent, clear solution. This solution is added via dropping funnel to the 5 L flask. The stir speed is adjusted to account for changing viscosity of the fluid, water addition occurred over the course of 2-3 hours. The mixture is aged at 95 degrees Celsius for 24 hours.

Two different processes are carried out with the obtained slurry. 1.) Alumina-water slurry. Distilled water (1.47 L) is added to the flask in order to remove butanol via azeotropic distillation (bp ca. 87 degrees Celsius) and to yield a water slurry of 5 percent solids. 2.) Extracted Solid. The obtained slurry described above is filtered through a #50 filter paper on a Buchner funnel, washed with ethanol and then the obtained solid is extracted with ethanol in a Soxhlet apparatus. The solid is dried in a vacuum oven at 80 degrees Celsius, yield 164 g. The dry material is heated under $N_2$ in a tube furnace from room temperature to 550 degrees Celsius at a heating rate of 2 degrees Celsius/min, maintained at 550 degrees Celsius for 1 hr and calcined in a flow of air at 550 degrees Celsius for 5 hours to get Catalyst Product 8.

Figure 5:
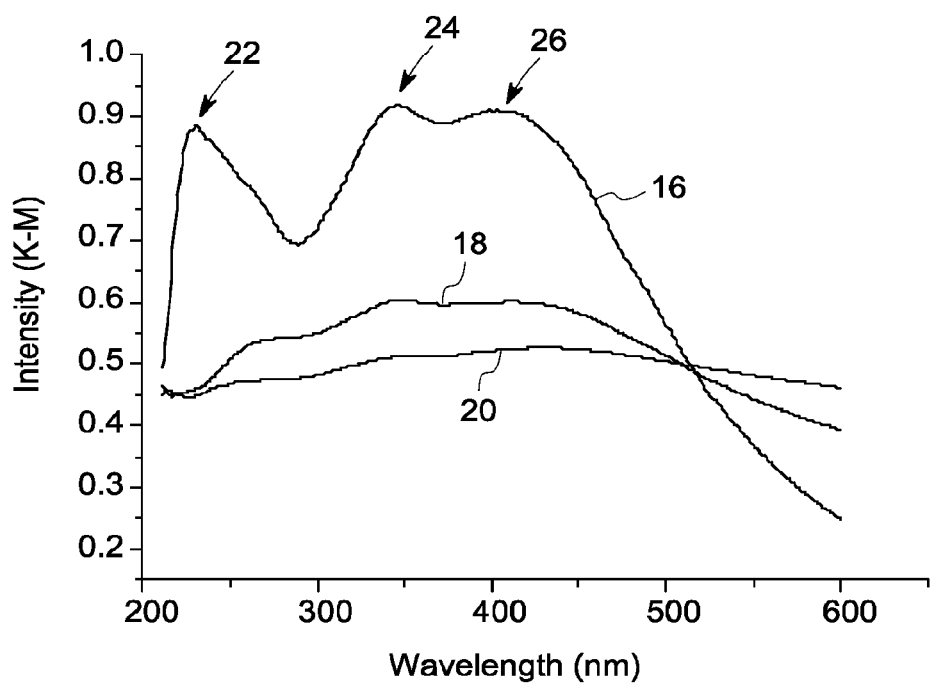
FIG. 5 is a visible-ultra-violet spectra.

FIG. 5 is a graph that plots VIS-UV absorbance intensity at different wavelengths. The plot compares the Comparative Ag STD, Ag TA (sol-gel) and Ag TA (impregnated), all having the same Ag percent. The test conditions are under $H_2$ at 30 degrees Celsius (spectra have been subtracted with the ones from fresh catalyst under He at 30 degrees Celsius). The Ag TA (sol-gel) is a silver templated alumina catalyst made by the sol gel process and Ag TA (impregnated) is a silver templated alumina catalyst made by the impregnation process. Particularly, Curve 16 is a comparative plot for 8 percent Ag with standard Norton alumina under $H_2$ at 30 degrees Celsius. Curve 18 is a plot for 8 percent Ag with templated alumina made by sol gel method under $H_2$ at 30 degrees Celsius (Catalyst Product 8). Curve 20 is a plot for 8 percent Ag with templated alumina made by impregnation method under $H_2$ at 30 degrees Celsius. In FIG. 5, curve 16 indicates the amount of silver ion ($Ag^+$) agglomeration, the peak is identified with reference number 22, silver (Ag) cluster agglomeration, peak 24, and Ag particles agglomeration, peak 26.

Figure 6:
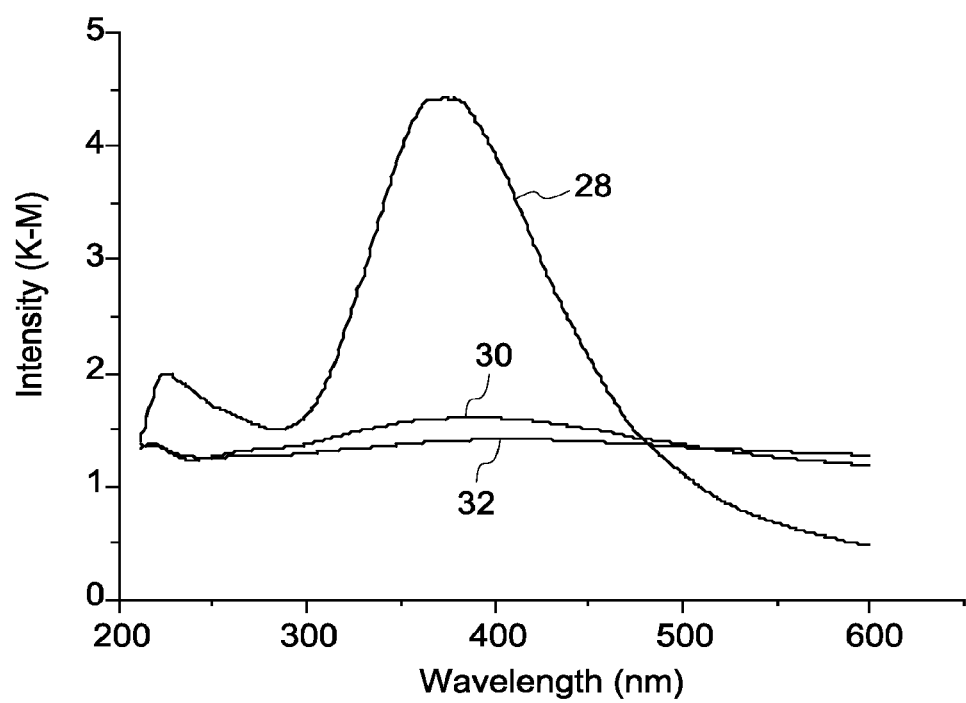
FIG. 6 is a visible-ultra-violet spectra.

FIG. 6 is a graph that plots VIS-UV absorbance intensity at different wavelengths. Curve 28 is a comparative plot for 8 percent Ag with standard Norton alumina under $H_2$ at 300 degrees Celsius. Curve 30 is a plot for 8 percent Ag with templated alumina made by sol gel method under $H_2$ at 300 degrees Celsius (Catalyst Product 6). Curve 32 is a plot for 8 percent Ag with templated alumina made by impregnation method under H2 at 300 degrees Celsius. For the standard silver alumina catalyst (curve 18) the agglomeration is very high whereas for the silver templated alumina catalyst the agglomeration is low, showing the relatively different properties with regard to the silver templated alumina catalyst.

With respect to FIG. 6 the graph that shows the Catalyst Product 6 is having a VIS-UV absorbance intensity that is at least 20 percent less than a comparative silver alumina catalyst (Ag STD). The standard alumina is Norton alumina, and which has the same amount of silver by weight, at a wavelength in a range of from about 350 nm to about 500 nm, under $H_2$ at 30 degrees Celsius.

Catalyst Product 6 has a visible-ultra-violet (VIS-UV) absorbance intensity that is at least 20 percent less than a standard silver alumina catalyst (Ag STD), under $H_2$ at 30 degrees Celsius and at a wavelength that is in a range of from about 350 nanometers (nm) to about 500 nm. The standard alumina is Norton alumina, and has the same amount of silver by weight as the instant composition. FIGS. 5 and 6 indicate an amount of silver (Ag) agglomeration (Ag particles and mainly Ag clusters) and silver ion ($Ag^+$) agglomeration. For the standard silver alumina catalyst, the agglomeration is relatively high, whereas for the silver templated alumina catalyst the agglomeration is relatively low. The agglomeration level affects, and possibly controls, the function and efficacy of the corresponding material.

High throughput Screening (HTS) Reactor:

The reactor mixes gases (using mass flow controllers—MFCs, Brooks and MKS) and up to two liquids (usually water and a liquid reductant) which are vaporized. The water and liquid reductant are pumped in under pressure. The gas mixture enters the heated (~115 degrees Celsius) top box and goes into a manifold that contains 32 capillary exit tubes. The gas is restricted in the manifold and the pressure builds up to ~60 psi. Backpressure indicates the same amount of gas is flowing out of each capillary. The capillaries (stainless steel) open up into tubes (INCONEL, stainless steel) where the catalyst is positioned. This zone is a copper block that can be temperature controlled.

The catalyst powders (25-50 mg) are held in place by quartz wool that has been wedged into the tube. Each tube can be individually sampled by controlling the two switching valves. The flow of the outlet stream is measured and recorded. The flow can be diverted through a deep oxidation catalysts (Pt/$Al_2O_3$ from Johnson Matthey) to determine $N_2$ selectivity. The flow then passes through a diluter (CAI, Model 701) that takes 25 ml/min from the reactor (which generally puts out ~35-40 mL/min) and mixes it with 1000 ml/min house $N_2$ (~25:1 dilution). The diluted sample is pulled though the $CO/CO_2$ detector (CAI) by a pump in the $NO_x$ detector (CAI, Model 600 HCLD). The $NO_x$ value is recorded. It is possible to record the NO and $NO_2$ values separately. A LABVIEW program controls many features of the reactor system. The MFCs are not controlled by the software but their settings are recorded. The software controls the temperature of the reactor block and the switching of the values. The software records amount CO, $CO_2$ and $NO_x$ from the analyzers. The reductant delivery is checked by measuring $CO_2$ level, after the feed is completely combusted over the Deep Oxidation Catalyst (DOC).

The screening conditions are as follows: gas composition: 12 percent $O_2$, 600 ppm nitrogen oxide (NO), 7 percent $H_2O$, 1 ppm $SO_2$ and the balance $N_2$. The catalysts are pretreated with 7 percent $H_2O$ and 50 ppm $SO_2$, 12 percent $O_2$ for 7 hours at 450 degrees Celsius to "age" or sulfur soak the catalysts. The reductant used is a liquid mixture composed of: 2,2,4 Trimethylpentane (64 weight percent), octane (7 weight percent) and toluene (29 weight percent), also known as Moctane. Another liquid reductant used in a few experiments is a distillation cut (<210 degrees Celsius) of ultra low sulfur diesel (ULSD) fuel. For all the experiments mentioned using the HTS reactor, the C1:NO ratio used is 8 (C1:NO is defined as the number of carbon atoms in the reductant stream per number of NO molecules).

Each run examines the catalysts at three different temperatures 275 degrees Celsius, 375 degrees Celsius and 425 degrees Celsius and the catalysts are tested in triplicates. Data is presented as percent NOx conversion by measuring the $NO_x$ concentration through tube #1 with no catalyst present and then measuring the $NO_x$ concentration over the other tubes with catalysts and determining the percent change.

The catalysts screened in the 32-tube reactor are prepared by incipient wetness impregnation of the sized support (425-710 nanometers) with a silver nitrate ($AgNO_3$) solution. The volume of the $AgNO_3$ solution used is twice the pore volume of the support and contained the correct number of moles of Ag to hit the target mole percent. The pore volume of the support is obtained from the BET measurement report. In one condition of the experiment, the catalysts containing 2 mole percent Ag on Norton alumina is called AgSTD and is present in runs as a control. The impregnated materials are dried in a vacuum oven at 80 degrees Celsius and then calcined in air at 600 degrees Celsius for 6 hours in a box furnace.

The prepared catalysts are weighed out (~50 mg) and placed in 2 ml GC vials until used in the reactor. The exact weight of each catalyst is measured using a Bohdan weighing robot.

Scale-Up Reactor:

The experimental setup is described in brief. The catalyst to be tested is installed in a quartz-tube reactor (19 mm I.D.) located inside a furnace. Temperature, pressure, space velocity over the catalyst, and gas composition at the inlet of the reactor are controlled. This reactor is fully automated and experimental test matrix can be run over an extended period of time (days or weeks). Analytical lines allow for the measurement of NO, $NO_2$ (chemiluminescence detector), CO, $CO_2$ (IR detector), and $SO_2$ (UV-Vis detector). Also, a deep oxidation catalytic bed located before the analytical lines can be either flown through or by-passed. When by-passed, the NOx concentration measured (NO+$NO_2$) is referred to as "NOx concentration". When flown through the Deep Oxidation Catalyst (DOC, Johnson-Matthey catalyst, Pt/$Al_2O_3$, SV <20000 $hr^{-1}$, T=450 degrees Celsius), the NOx concentration measured (NO+$NO_2$) is referred to as "NOt concentration". Therefore, the difference between those two values (NOx concentration−NOt concentration) corresponds to the quantity of NOx species that reacted in the quartz-tube reactor to form new chemicals, which are oxidized back to NO or $NO_2$ in the DOC. These nitrogen-containing species are called RONOs. RONOs are unidentified by-products of the SCR reaction of NOx to nitrogen.

Catalysts are tested under experimental conditions reported in Table 1. The total powder catalyst weight is 2.7 grams. The total volumetric flow rate over the catalyst is 3 SLPM.

The powder bed is placed at least 24" from the inlet of the quartz tube to allow for preheating of the feed gas. The powder bed is packed between two 0.5 grams plugs of quartz wool.

TABLE 1

| Experimental Conditions | |
|---|---|
| X's | Values |
| NO (ppm) | 475, 610, 690 |
| $O_2$ (percent) | 12 |
| C1:NO ratio | 6 |
| $H_2$:NO ratio | 0, 3:1 |
| $H_2O$ (percent) | 7 |
| Temperature (degrees Celsius) | 275, 375, 430 |
| $SO_2$ (ppm) | 0 |
| CO (ppm) | 250 |
| $CO_2$ (percent) | 0 |

Moctane, Ethylene+Propylene (C2_C3), Ultra Low Sulfur Diesel (ULSD) and Diesel Fraction 1 are used as reductants. Liquid reductants are pumped by a HPLC pump (ASI model 500G) and vaporized/diluted at 300 degrees Celsius with nitrogen before being injected in the reactor. Gaseous reductants are metered and delivered with Mass Flow Controllers (MFCs). The amount of reductant injected is quantified by deep oxidation on Pt/$Al_2O_3$ catalyst at 450 degrees Celsius (space velocity below 20,000 $hr^{-1}$) followed by the measurement of $CO_2$ concentration in the gas stream. The assumption that full catalytic combustion of the reductants takes place is validated by the fact that very low CO concentrations are measured. In addition, deep oxidation of reductants provided the Cl (ppm of molecular carbon) equivalent number (equal to $CO_2$ concentration, in ppm), which allows for the computation of the Cl/NO ratio.

Figure 7:
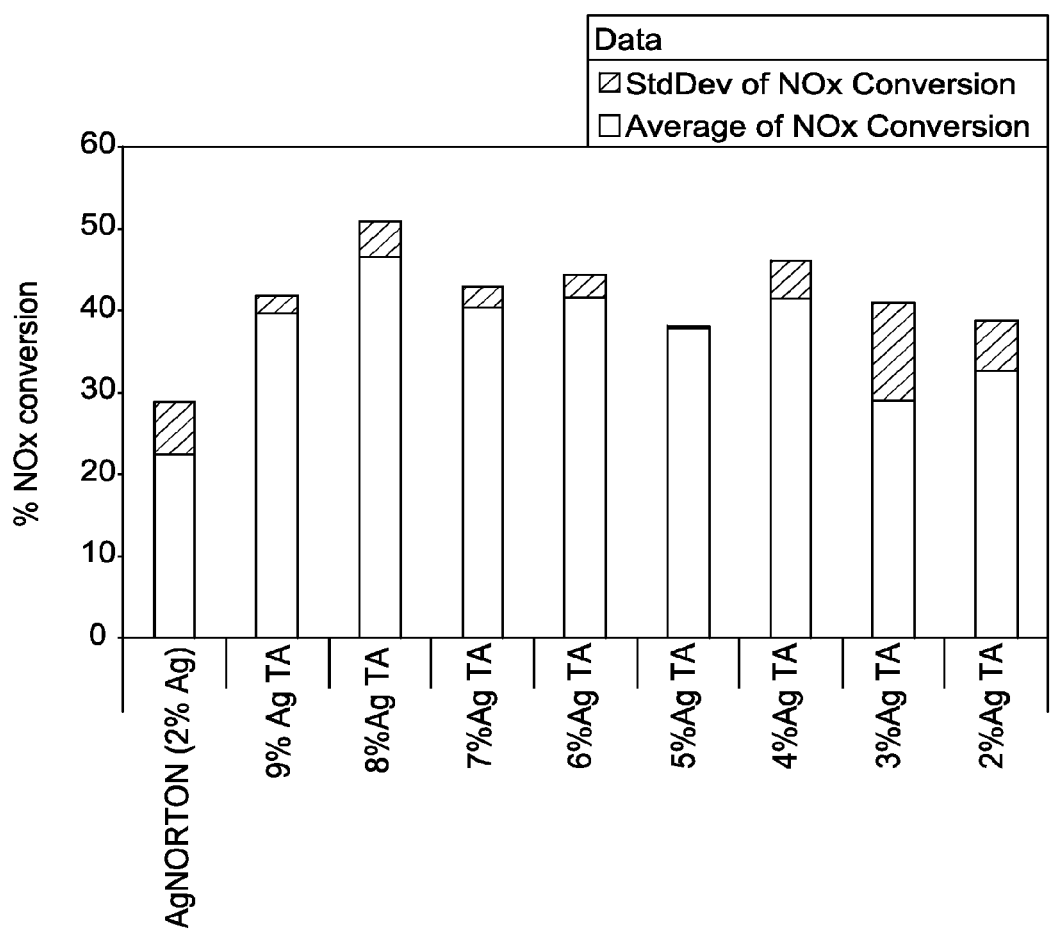
FIG. 7 is a graphical representation of the average NOx conversion and standard deviation.
Figure 8:
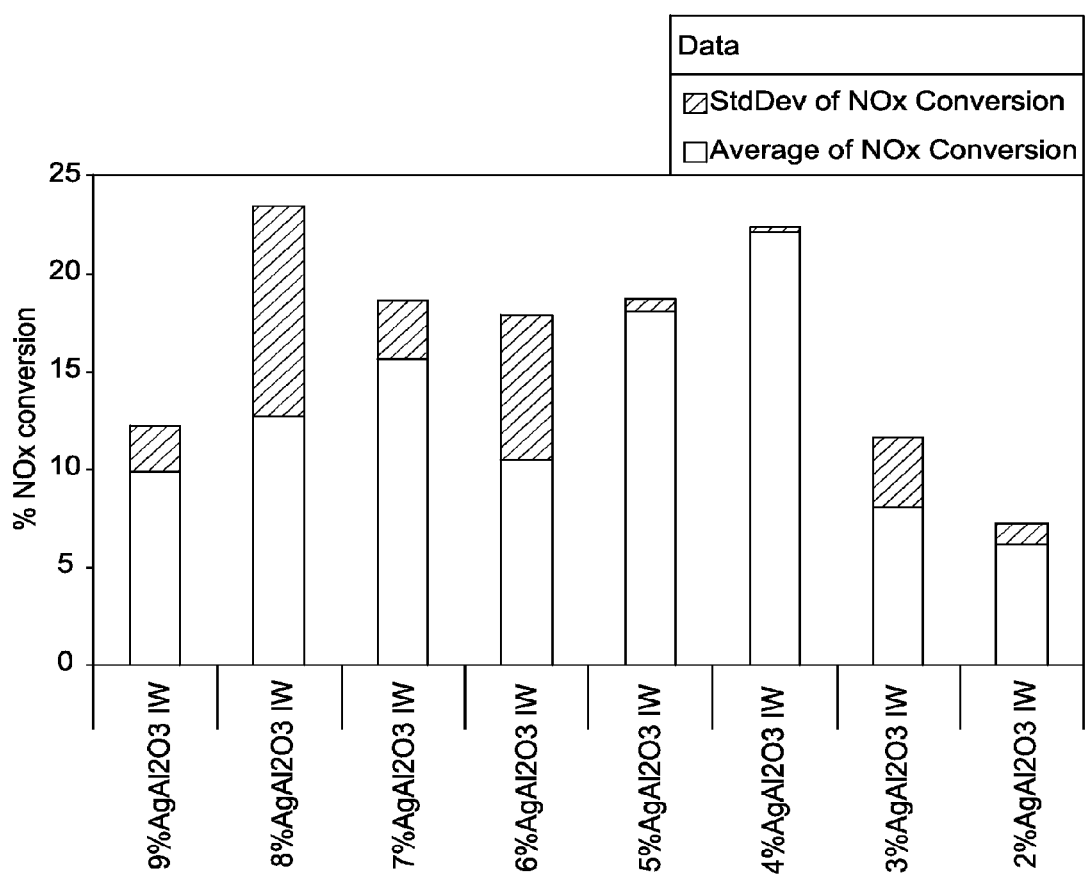
FIG. 8 is a graphical representation of the average NOx conversion and standard deviation.

FIG. 7 is a graphical representation of the average NOx conversion and the standard deviation at 325 degrees Celsius using catalyst of templated alumina with silver loading of 2 percent, 3 percent, 4 percent, 5 percent, 6 percent, 7 percent, 8 percent, and 9 percent. FIG. 8 is a graphical representation of the average NOx conversion and the standard deviation at 325 degrees Celsius using Norton alumina with silver loading 2 percent, 3 percent, 4 percent, 5 percent, 6 percent, 7 percent, 8 percent, and 9 percent.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In describing, the products of the instant invention as a reaction product of initial materials reference is made to the initial species recited and it is to be noted that additional materials may be added to the initial mixture of synthetic precursors. These additional materials may be reactive or non-reactive. The defining characteristic of the instant invention is that the reaction product is obtained from the reaction of at least the components listed as disclosed. Non-reactive components may be added to the reaction mixture as diluents or to impart additional properties unrelated to the properties of the composition prepared as a reaction product. Additional reactive components may be added; such components may react with the initial reactants or they may react with the reaction product; the phrase "reaction product" is intended to include those possibilities as well as including the addition of non-reactive components.

The embodiments described herein are examples of composition and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A method, comprising: reacting a metal alkoxide with a silver composition and a templating agent to form a reaction product; hydrolyzing the reaction product to form a hydrolyzed reaction product; condensing the hydrolysed reaction product to form a templated substrate; and controlling the reacting, hydrolyzing and condensing step to control the silver loading of the templated substrate, and the silver loaded templated substrate having a VIS-UV absorbance intensity that is at least 20 percent less than a standard silver alumina catalyst, and which has the same amount of silver by weight at a wavelength in a range of from about 350 nm to about 500 nm, under $H_2$ at 30 degrees Celsius.

2. The method as defined in claim 1, wherein the condensing step includes calcinating.

3. The method as defined in claim 2, wherein the calcinating is done at a temperature greater than 350 degrees Celsius for a time period greater than 10 minutes.

4. The method as defined in claim 1, the metal alkoxide is aluminium alkoxide.

5. The method as defined in claim 1, wherein the silver composition is selected from a group consisting of silver salt of inorganic acids, silver salt of organic acids, and silver oxides.

6. The method as defined in claim 1, wherein the templating agent comprises a surfactant, cyclodextrin, or a crown ether.

7. The method as defined in claim 1, controlling the silver loading wherein the silver is present in an amount of at least about 2 weight percent based on a total weight of the substrate.

8. The method as defined in claim 7, wherein the silver further is in an amount of less than or equal to 10 weight percent of a total weight of the substrate.

9. A method comprising: introducing a gas stream in a chamber having a composition comprising a templated metal oxide substrate having a plurality of pores, a catalyst material comprising an amount of silver, wherein the composition having a VIS-UV absorbance intensity that is at least 20 percent less than a standard silver alumina catalyst, and which has the same amount of silver by weight at a wavelength in a range of from about 350 nm to about 500 nm, under $H_2$ at 30 degrees Celsius; and reducing nitrogen oxide present in the gas stream at a temperature in a range of from about 275 degrees Celsius to about 350 degrees Celsius in the chamber.

10. The method as defined in claim 9, wherein reducing nitrogen oxide present in the gas stream occurs at a temperature, further, that is less than about 325 degrees Celsius in the chamber.

11. The method as defined in claim 9, wherein reducing nitrogen oxide present in the gas stream occurs at a temperature in the range from about 300 degrees Celsius to about 325 degrees Celsius in the chamber.

* * * * *